(12) United States Patent
Lee et al.

(10) Patent No.: US 7,068,149 B2
(45) Date of Patent: Jun. 27, 2006

(54) SYSTEM AND METHOD FOR FACILITATING DELIVERY AND RETURN SERVICE

(75) Inventors: Cheng Chin Lee, Singapore (SG); Hon Chew Lee, Singapore (SG)

(73) Assignee: First Cube Pte Ltd, Singapore (SG)

( * ) Notice: Subject to any disclaimer, the term of this patent is extended or adjusted under 35 U.S.C. 154(b) by 82 days.

(21) Appl. No.: 10/493,045

(22) PCT Filed: May 30, 2002

(86) PCT No.: PCT/SG02/00107

§ 371 (c)(1),
(2), (4) Date: Apr. 16, 2004

(87) PCT Pub. No.: WO03/040979

PCT Pub. Date: May 15, 2003

(65) Prior Publication Data

US 2005/0068178 A1   Mar. 31, 2005

(30) Foreign Application Priority Data

Oct. 17, 2001   (SG) .............................. 200106373-4

(51) Int. Cl.
*G08B 1/00* (2006.01)

(52) U.S. Cl. .............................. 340/286.06; 340/568.1; 340/569; 340/5.73; 232/24; 235/382

(58) Field of Classification Search ........... 340/286.06, 340/568.1, 569, 5.5, 5.73, 550, 551, 552, 340/666, 667, 686.6; 234/34; 232/24, 36, 232/37; 235/381, 382
See application file for complete search history.

(56) References Cited

U.S. PATENT DOCUMENTS

| | | | |
|---|---|---|---|
| 6,483,433 B1 * | 11/2002 | Moskowitz et al. | 340/568.1 |
| 6,748,295 B1 * | 6/2004 | Tilles et al. | 700/241 |
| 6,885,281 B1 * | 4/2005 | McGunn et al. | 340/5.5 |
| 6,933,832 B1 * | 8/2005 | Simms et al. | 340/5.73 |

* cited by examiner

*Primary Examiner*—Davetta W. Goins

(57) ABSTRACT

A system and method for facilitating delivery and return service between a delivery party and a receiving party. These parties may or may not have pre-registered to use the locker system. The system has locker modules (35) and a system controller (10). The system controller (10) interfaces with the locker modules (35) via a network (30). Each of the locker modules (35) has locker units for depositing and retrieving the goods and a locker controller coupled to control the locker units. Together, the system controller (10) and the locker controller enable steps of the method by processing a user input that is received via a user input interface coupled to the system controller (10) and the locker controller. The user input is associated with the receiving party and provided by the delivery party. Thereafter, the system controller (10) generates a notification message having an identification code for transmitting to the receiving party.

22 Claims, 9 Drawing Sheets

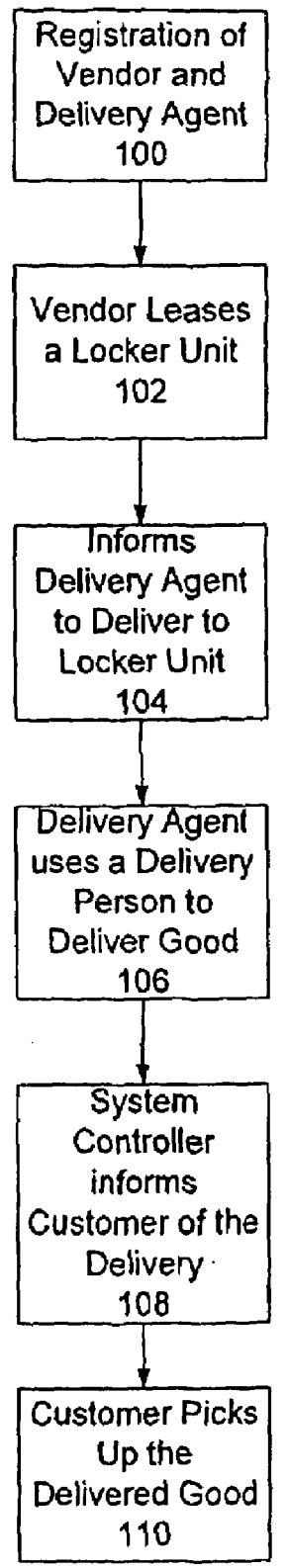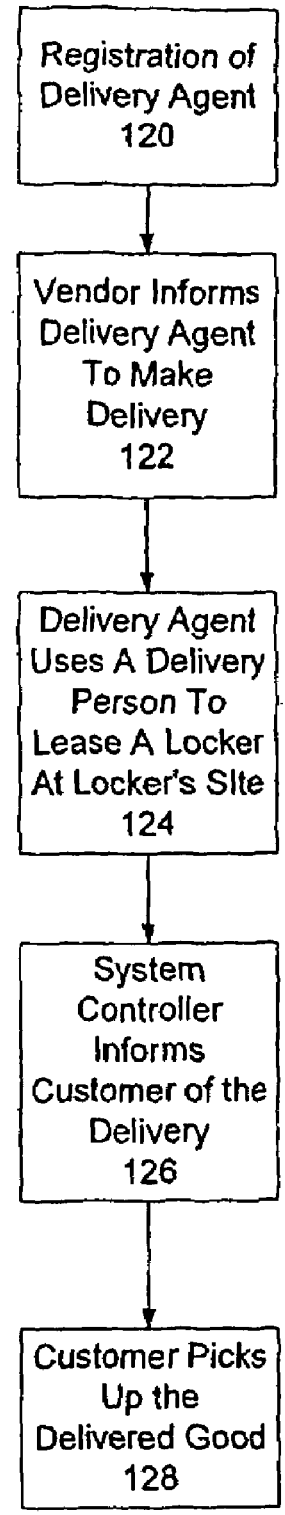
FIG. 6A
FIG. 6B

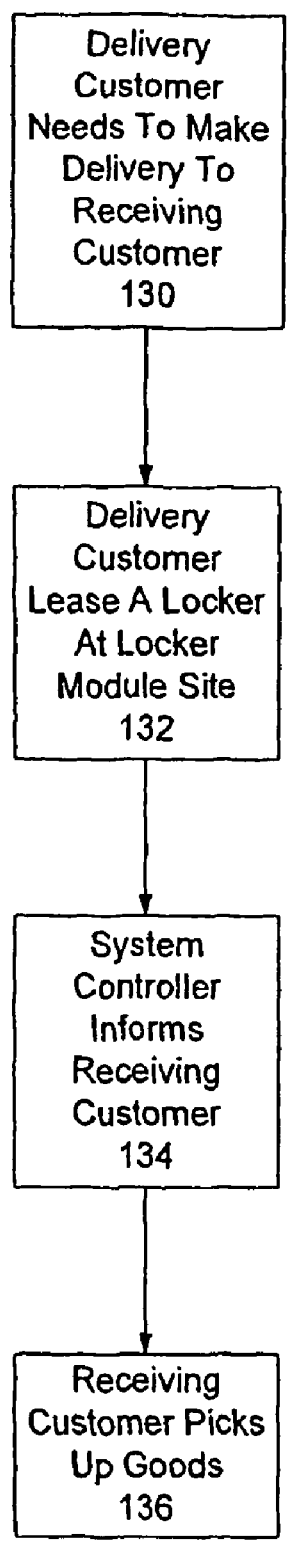 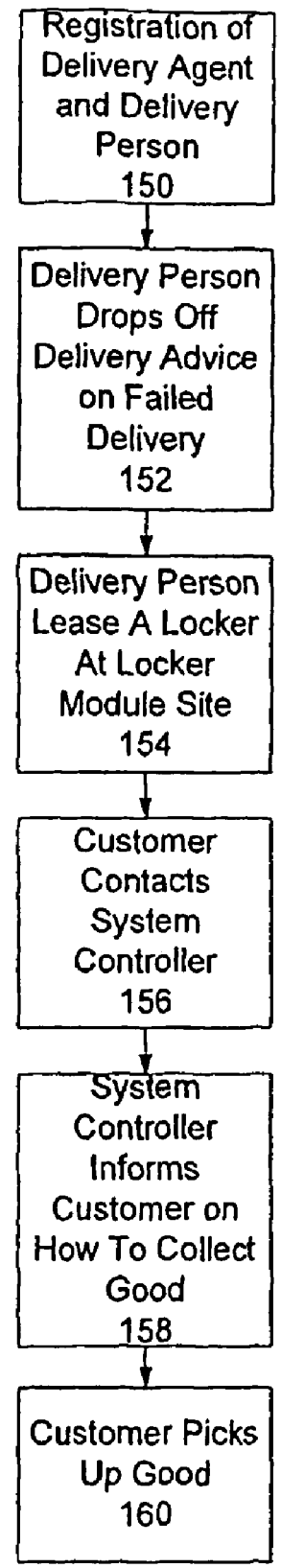
FIG. 6C                    FIG. 6D

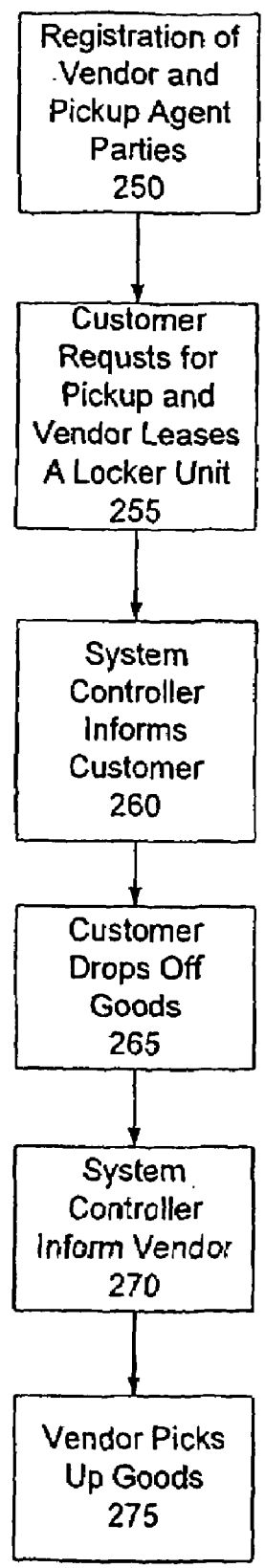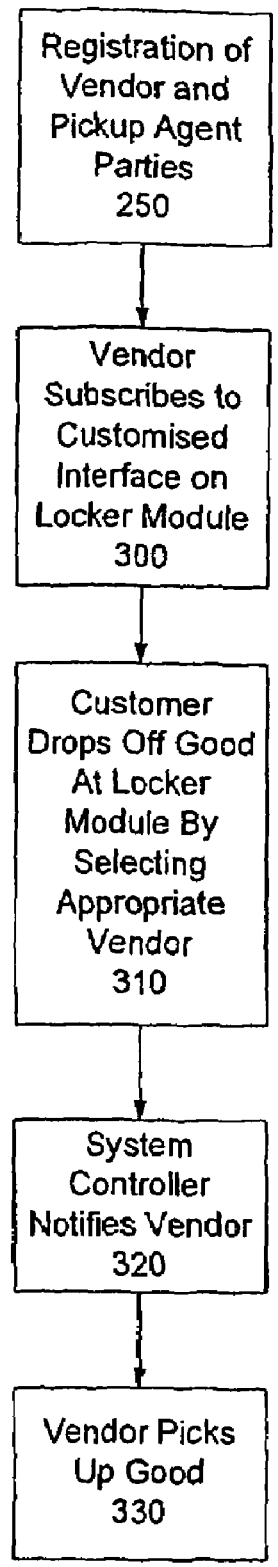
FIG. 7A
FIG. 7B

SYSTEM AND METHOD FOR FACILITATING DELIVERY AND RETURN SERVICE

FIELD OF THE INVENTION

The present invention relates generally to the field of goods delivery, returns and storage systems, and in particular, to a locker system and method for facilitating delivery and return of transported goods such as parcels, laundry, grocery and personal items.

BACKGROUND OF THE INVENTION

It is a well known fact that the pace of modern day life is fast and often leaves people with no time to shop, collect their deliveries, do their laundry, or simply meet one another to hand over personal items. This has led many people to turn to services that give them more time and convenience. One of the services that are increasingly popular is the ordering of goods to be delivered to the user's place of residence. These days, all types of goods can be ordered and delivered. For instance, many department stores have catalogues where virtually every item sold in the stores can be ordered by mail. Even businesses that traditionally did not previously make regular deliveries such as the groceries or laundries are now offering a delivery service. People are also turning to personal concierge services to perform errands such as delivery, returns or pick up items for them during their working hours simply because they do not have the time.

Although the convenience of having an item delivered to a desired location as opposed to traveling to the place where that item is sold is desirable, receiving the item can be a problem. This is because someone has to be physically present at the desired location to receive the item and this may not be possible for some people in various situations. For example, home occupants that are not at home during office hours are likely to find delivery or pickup of items at such hours inconvenient or uncomfortable to use. Hence, the delivery of goods in existing delivery and pickup systems can be improved to accommodate such situations. (The terms 'pickup' and 'returns' are used interchangeably.)

Most existing delivery and pickup systems focus solutions to the above problem by using of one or more electronically-controlled lockers to facilitate the delivery and pickup of goods. These lockers are placed either outside homes or at common areas serving more than one apartment block where there is high human traffic. In some cases, these lockers are stand-alone systems that serve only specific merchants or users. In some of these systems, the lockers are communicatively linked to a central controller that is shared by a variety of merchants and users. Notification messages are transmitted to the receiving party to inform them of the need to pick up their deliveries.

Common among most existing delivery and pickup systems is the need for either a delivery party or a receiving party or both parties to be registered with the central controller prior to using such systems. For example, in U.S. Pat. No. 5,774,053 Porter, codes associated with a vendor, a delivery person and a customer have to be stored in a storage device prior to delivery and pickup in which these codes are required. In U.S. Pat. No. 5,774,053 Porter, both the vendor and the customer must first be registered with a central controller so that their respective codes are made available to the storage device. In the transaction-oriented electronic accommodation system described in U.S. Pat. No. 6,116,506 Matsumoto et al and U.S. Pat. No. 6,230,971 Matsumoto et al, both assigned to Hitachi Ltd., all users or addressees must be registered with the system before deliveries can be made. Also, only registered or authorized vendors or delivery persons can make deliveries or perform pickups from storage devices of the system. Access to the system is done using access codes or personal identification numbers (PIN) assigned when they are registered with the system.

Registration of vendors, delivery agents and their delivery persons may seem to be an insignificant procedure. However, for large companies with many delivery persons making many different deliveries each day, this can be quite challenging. For example, a post office may have several thousand postmen making deliveries and every one of them have to be registered with a unique code. In U.S. Pat. No. 5,774,053, the codes have to be stored in the storage device. Although only codes for delivery persons who cover the area of the storage device need to be stored, high turnover of delivery persons and frequent changing of delivery routes makes the administration of such codes complex and tedious.

For the systems described above, registration of users is ideal but not always practical. Users who receive deliveries or make returns regularly generally find it easy to remember their codes or PINs to make collections. However, in most cases, users tend to receive deliveries once in a while. While these users may register to use a system for the first time, such users may forget their codes or PINs the next time they want to use the system. A user in such a situation generally does not use the system or may register again by creating another account. Duplication of registration details is not desirable because the system then has to create and maintain accounts that may not be used more than once and that then become what are known as "dead accounts". In most cases, during registration, users would also provide the system with information on how they can be notified when there is an item or goods to be picked up. This can be in the form of an email address or a mobile phone number. However, managing such information is troublesome, especially when users change their email addresses or mobile phone numbers.

In the systems described above, the assumption is that both the delivery party and the receiving party are aware of and want to use such systems for deliveries. A user normally initiates this by indicating a delivery to be made to a specified storage device. Instructions are then recorded in a delivery note so that a delivery person knows that the delivery is to be made to the storage device. However, in delivering goods to people who are not at home and are not registered to use such systems, a delivery person has to make at least one more trip to complete a delivery even if storage devices of such systems are located nearby. In this case, the delivery person is unable to take advantage of such systems due to a lack of information such as, for example, whether a person is registered to use a system and particulars of that person.

In most existing delivery and pickup systems, some Identification card (IC Card) is used as a credentialing means at a storage device. While this is widely accepted, it creates a problem when the IC card is lost, spoilt or cancelled. For example, when a user decides to cancel a credit card registered for use in a delivery and pickup system, he then has to register a cancellation of the credit card with the system and provide information for a replacement card. This can be a tedious process that is undesirable.

Although many existing delivery and pickup systems have been developed, such systems do not adequately address the above problems. Therefore, what is needed is a delivery and pickup system that keeps track of all transactions and transacted parties, reports status of these transactions and intelligently keeps payment data relating to the transactions. Such a system should also be reliable, safe and convenient to use. Furthermore, the delivery and pickup system should preferably not require user registration or users to have prior knowledge of the system. In addition, the delivery and pickup system should be able to provide all relevant parties automated notification of a delivery in a convenient manner. Such a delivery and pickup system is currently not available.

BRIEF DESCRIPTION OF THE DRAWINGS

A preferred embodiment of the present invention is more fully described, by way of example, with reference to the drawings of which:

FIGS. 6A to 6D are simplified flow diagrams illustrating the steps for facilitating a delivery transaction under different delivery scenarios within the locker system of FIG. 1;

FIG. 7A and FIG. 7B are simplified flow diagrams illustrating the steps for facilitating a good returns transaction under different pickup scenarios within the locker system of FIG. 1;

DETAILED DESCRIPTION OF THE DRAWINGS

Figure 1:
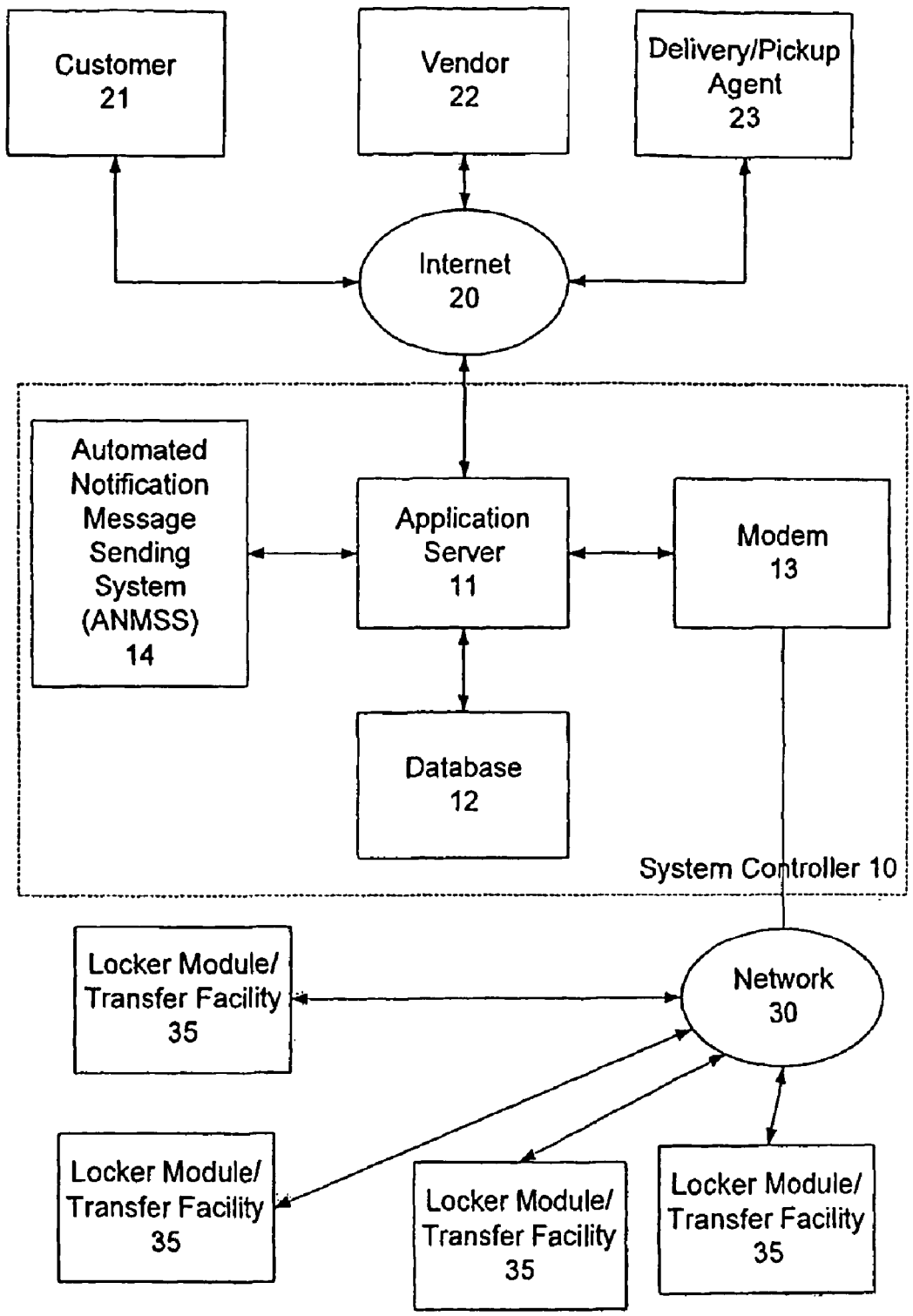
FIG. 1 is a block diagram of a locker system in accordance with the present invention.

In general, the present invention provides a locker system and methods for facilitating a delivery or return of goods in the locker system by providing a temporary transfer facility where the delivery or return occurs. The transfer facility is placed at locations convenient to a user to pick up the goods. In most instances, such locations are at high-density residential areas such as an apartment complex, though other high human traffic areas such as a train stations, community centres and post offices are also possible. The transfer facility can also be located outside a merchant's premises, so as to allow 24-hour seven days a week collection access for their users. In this case, the transfer facility can be licensed for the merchant's sole use.

An advantage that the invention provides over existing delivery and pickup systems is that the transfer facility for goods is available for both registered and non-registered users of the locker system. Hence, any user can use the locker system without the need for pre-registration or signing up for a subscription service. This is useful as in many cases; the request for a delivery or return of goods is usually for transactions done on impulse and the need for registration may deter potential users of such a system.

Another advantage of the invention is that notification messages are sent via common notification mean to parties of transactions who have goods to be delivered to them to thereby inform them to pick up the goods. This is done through notification identifiers normally provided by the parties at the time when a delivery or pickup is required. A unique identification code such as, for example, a personal identification number (PIN) is provided for each notification for pickup or delivery. This eliminates the need for parties to remember an identification code, which they may not use that frequently. While some existing delivery and pickup systems send a notification message to users informing them that a delivery has occurred, such systems typically requires the users to pre-register and to provide their contact details and identification codes.

A further advantage of the invention is that a delivery person can deliver a good using the transfer facility and a receiving party can collect the good from the transfer facility even if the receiving party did not provide any notification details to the delivery person.

The present invention also provides a system controller to manage a network of such transfer facilities. The system controller functions include automatic sending of notification messages, lease management, registration and management of users, logging of alarms, exceptions and transactions, online transactions and management of accounts for individual parties.

The operation of the locker system, in its most basic form, involves a delivery party and a receiving party. The delivery party is the party that wishes to make a goods transfer to a receiving party. The receiving party is the party that is willing to accept the delivery from the delivery party. However, more than two parties may be involved in a transfer of goods. In some cases, the delivery party and the receiving party can be one and the same.

Typically, in a delivery scenario, the parties would include a customer, a vendor, and a delivery agent communicatively coupled to the system controller. For such a delivery scenario, the customer is a purchaser of a good, the vendor is the seller of the good and the delivery agent is an entity that is responsible for delivering the good. The system controller in this delivery scenario facilitates the transactions associated with delivery of the good. The delivery party in this delivery scenario comprise both the vendor and the delivery agent, while the receiving party is the customer.

In another delivery scenario, there could be just two individuals where one individual wants to make a personal delivery to the other individual. In this delivery scenario, the individual making the personal delivery is the delivery party and the individual accepting the delivery is the receiving party.

Typically, in a pickup scenario, the parties would include a customer, a vendor, and a pickup agent communicatively coupled to the system controller. The customer is the person who wants to make a return of a good and the vendor is the recipient of the good. The pickup agent is the entity responsible for picking up the good. In this pickup scenario, the system controller is the party who facilitates the transactions for the pickup to occur. For such a pickup scenario, the delivery party is the customer, while the receiving party comprises both the vendor and the pickup agent.

Although in general the parties are separate and independent, in some situations, a party can take on multiple identities. For instance, in a delivery scenario, a large seller of goods may be both a vendor and a delivery agent with facilities for delivery of the goods. Also, one party may comprise multiple entities. For instance, a delivery agent may have many delivery persons, each of whom is registered with the system controller. The concept can also be extended to an individual customer who wishes to make use of the transfer facility for his own use. Accordingly, the individual customer represents both the delivery party and the receiving party.

In the preferred embodiment of the locker system, the transfer facility is one or more intelligent computer-controlled electronic locker modules that provide selective access to appropriate parties. These locker modules are remotely connected via any available communication means to a system controller either wirelessly or wired. Each of the locker modules can receive and send out signals to communicate with the system controller. The customer, the vendor and the delivery agent can also interact with the system controller via some communication network such as, for example, the Internet. Via an Internet linkage, the parties can handle various transactions such as registration, leasing, checking of status, etc. The system controller also provides notification messages to the customer, the vendor or the delivery agent using an automated notification system. The automated notification system informs the appropriate parties of a delivery that has been made or the need for a pickup of goods. The notification messages could be transmitted via email, mobile phone or pager using short message service (SMS) systems, Internet web pages, Interactive Voice Response (IVR) systems, instant messaging or any other common notification means.

The preferred embodiment of the invention can include the use of stores or collection centres utilizing a computer system that emulates facilities at the locker module. The preferred embodiment of the present invention utilizes the concept of leasing where a party wishing to use a locker unit for delivery or returns leases the locker unit for a fixed short-term duration until the delivery or the pickup is made.

FIG. 1 is a block diagram of a locker system in accordance with the preferred embodiment of the present invention. The locker system comprises a system controller 10 and locker modules 35 that are dispersed throughout a particular region. The system controller 10 is remotely and communicably (either via a wired line or a wireless channel) linked up with the locker modules 35. Each locker module 35 contains at least one locker unit and can both receive and send out signals to communicate with the system controller 10 through a network 30. The system controller 10 is also communicably linked to communication devices that are respectively associated with parties that include a customer 21, a vendor 22, and a delivery and pickup agent 23. In the locker system, the system controller 10 is linked to the communication devices via the Internet 20 so that the parties can access a website that is associated with the system controller 10. Via the Internet 20, these parties can handle various transactions such as registration, leasing, checking of status, etc. In this case, a user input interface for the parties is their computers that are connected to the Internet. The user input interface can also be provided at a locker module 35.

The system controller 10 also provides an automated notification message sending system 14 that sends notification messages to a user. In the preferred embodiment, this is done via the Short Message Service (SMS) network through the customer's mobile phone or pager.

However, it is clear that other types of network linkages between the various parties and the system controller 10 and notification devices are clearly possible.

FIG. 1 also illustrates the components of the system controller 10 that includes an application server 11 containing all the programs for controlling the transfer facility system and a database 12 that stores data. Some data is stored in the database 12 of the system controller 10 while some data is stored in an embedded database of the locker controller PC depending on its use. The data stored in the embedded database is periodically backed up to the system controller's database 12. The application server 11 is linked to a modem 13 that is linked to a public network such that the application server 11 is able to communicate with a locker module (54 of FIG. 3) having the an appropriate modem (54 of FIG. 3). The modems or any other communication apparatus can be configured to provide for both wired and wireless communication. The application server 11 is also linked to an automated notification sending system 14 such that notification messages, like SMS messages, can be sent automatically to the customer 21. Lastly, the application server 11 is connected to the Internet 20 so that customers 21, vendors 22, delivery agents 23, and the like, can access the system controllers web site.

Figure 2:
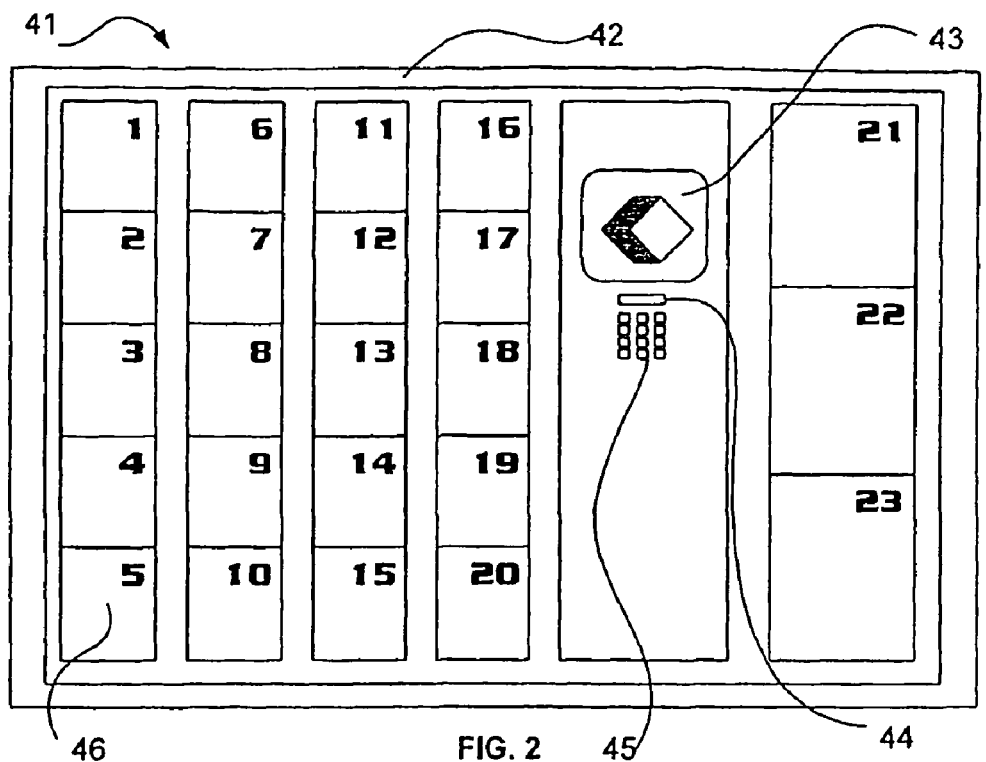
FIG. 2 illustrates the physical layout of a locker module of the locker system of FIG. 1.
Figure 3:
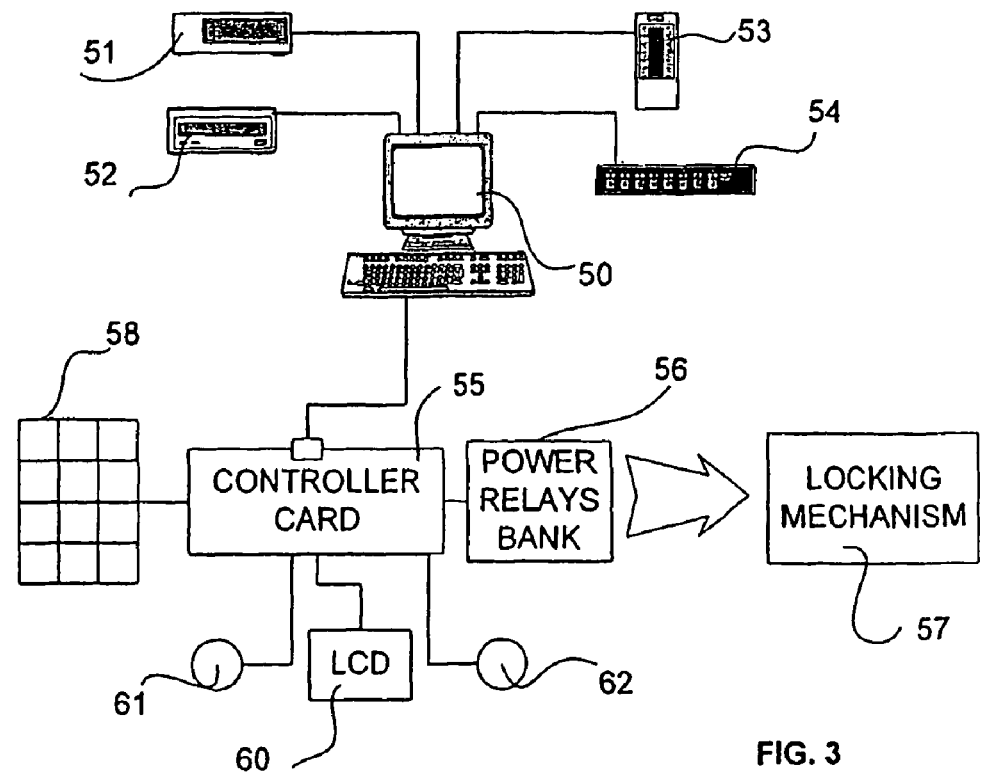
FIG. 3 is a schematic block diagram illustrating circuitry components of the locker module of FIG. 2.

FIG. 2 illustrates the physical layout of the locker module and FIG. 3 illustrates the schematic block diagram of the circuitry for the locker module 41. First referring to FIG. 2, the locker module 41 generally has a frame 42 and a plurality of locker units 46 with heavy-duty security doors that are numbered for easy reference. Each of the doors has a locking mechanism, which is controlled by the locker module's locker controller. The locker module 41 also comes with a user input interface and this could be a device such as a computer monitor 43 and a keypad 45 and a card slot 44. Other devices could include bar code readers, Radio Frequency Identifier (RFID) readers and wireless communication (e.g. Bluetooth, Infra-Red Data Port IrDA). In the preferred embodiment, the card slot 44 is adapted to receive smart cards, but can alternatively be made to receive other types of cards such as credit cards, debit cards, etc. Enclosed within the walls of the locker module 41 is the circuitry for controlling the operation of the locker module (shown in FIG. 3). The locker modules may optionally carry a camera for recording an image of a person using the locker module.

FIG. 3 illustrates in a schematic block diagram, the circuitry for controlling the operation of the locker module, which includes a main controller PC, which is basically a computer apparatus, which will be the locker controller 50 for handling the logical functions of the locker module. The locker controller 50 has an embedded database that is capable of storing data relating to a transaction. The locker controller 50 is linked to a smart card reader 52 and motorised card acceptor 51 for accepting and reading smart cards. The smart card reader 52 could double up as a payment device if the smart card serves as an electronic wallet as well.

The locker controller 50 is also linked to a wireless or land wired modem 54, which can send and receive signals. Although various wireless or wired communication technology such as SMS (short messaging service), paging, radio frequency signals may be employed, in the preferred embodiment, wired ISDN lines or cabled lines are used for wired communications while a wireless modem which employs a proprietary RF technology is used for wireless communications. Of course, the use of each type of communication medium would require a switch or router that is appropriate for the type of communication line being used and is dependent on the location of such locker modules.

Still referring to FIG. 3, the locker controller 50 is further linked to a controller card 55 which interfaces the locker controller 50 with the keypad 58, left and right momentary switches 61 and 62, respectively, and a monitor screen 60.

The keypad 58, and the left and right momentary switches 61 and 62 are basically other devices to provide more user input interface for the locker module and the monitor 60 is for display of user information and instructions. The locker controller 50 is further linked to the locking mechanism 57 via the controller card 55 and power relays bank 56 which provide interfacing between the controller PC 50 and the locking mechanism 57 such that the locker controller 50 has full control to lock and unlock the locking mechanism 57 of each locker unit. An uninterruptible power supply (UPS) 53 is optionally connected to the locker controller 50. Also, in the preferred embodiment an LCD monitor screen 60, a keypad 58 and left and right momentary switches 61 and 62 are used. The monitor 60 could be a liquid crystal display (LCD) with keypad 58, left and right momentary switches 61 and 62; or a touch screen LCD monitor.

Although a specific implementation is shown in FIG. 3, it should be understood that this implementation is illustrative only, and does not represent the only way the present locker module may be implemented. For instance, although in the preferred embodiment for the vendor, the delivery agent and the delivery persons, a smart card system is used, it should be understood that other types of credentialing method or device that can uniquely identify an individual are possible. A smart card is a relatively recent device, which is a plastic card with a microchip. As a standard, each smart card is associated with a unique serial number, which is extracted by the locker system. By associating a smart card and a pin number (identification code) to an individual, the smart card is able to uniquely identify a person. Similarly, other identification systems such as fingerprint recognition systems that can uniquely identify an individual may be used as an alternative to the smart card system. Such other identification systems just need to associate a notification identifier with a pin number or identification code. The notification identifier could be the mobile phone or pager number or a unique reference number that is assigned by the locker system. The smart card can be used for payment as well with the addition of the appropriate payment devices. Other forms of payment devices could also be introduced, for example, contactless card with electronic wallets.

Although the preferred embodiment as shown in FIG. 1 and FIG. 3 shows that the system controller and locker controller are two separate systems, it is not inconceivable for the system controller and locker controller to be combined into a single controller. In this case, the locker module may operate as a stand-alone system.

To more clearly illustrate the operation of the present invention, it is useful to define the role of each party and its relationship to the role played by another party.

Figure 4:
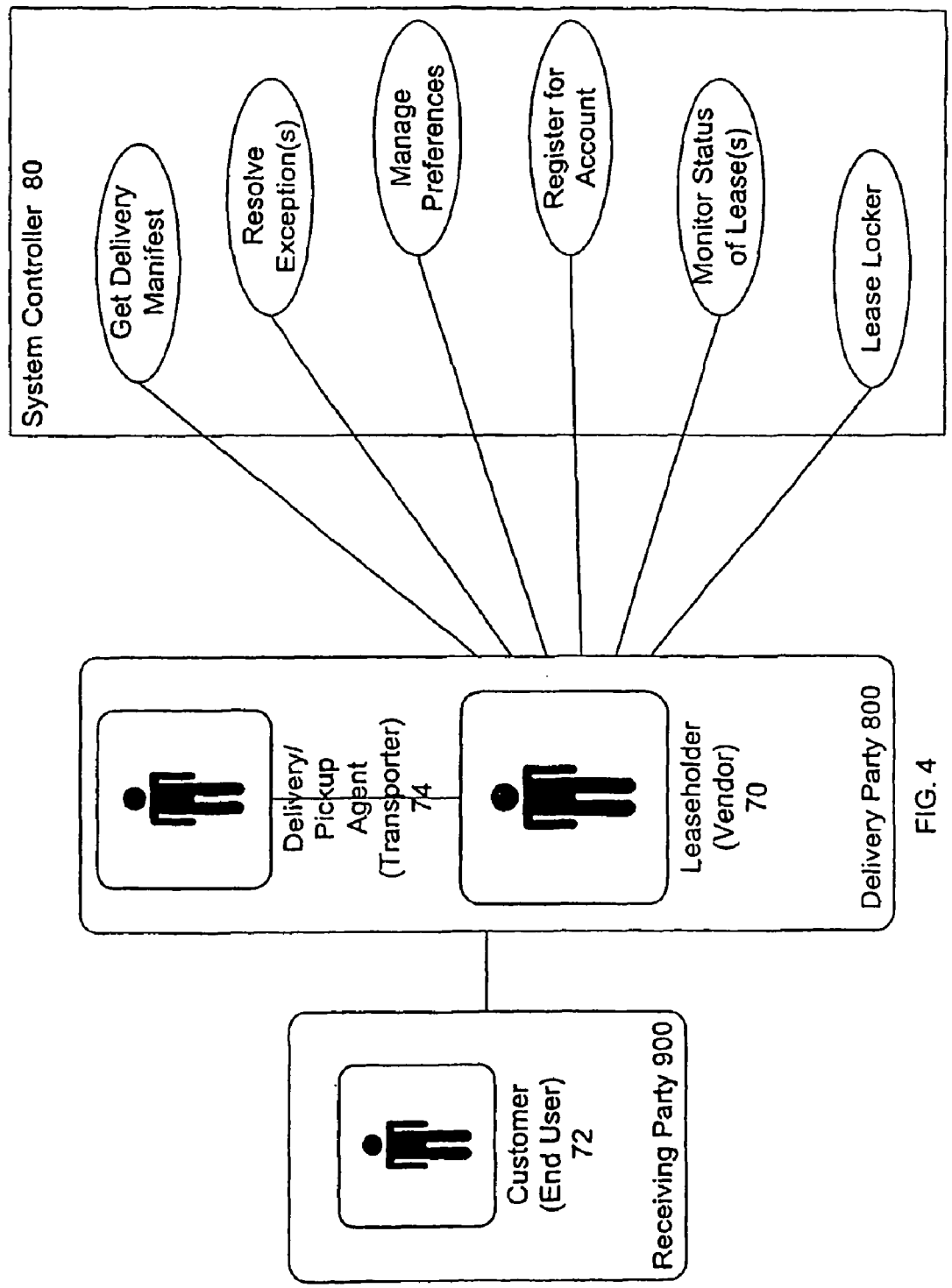
FIG. 4 shows relationships between parties involved in transactions using the locker system of FIG. 1.

FIG. 4 illustrates the several roles that are typical in a delivery system. As indicated earlier, the operation of this locker system in its most basic form involves a delivery party 800 and a receiving party 900, where the delivery party 800 is the one who drops off the good using the transfer facility and the receiving party 900 is the one who collects the good from the transfer facility. However, in the real world where delivery of goods takes place, normally either the delivery party 800 or receiving party 900 could comprise one or more different sub-roles.

The role of a delivery party can be further divided to include that of a leaseholder 70, and a delivery agent 74. The customer 72 plays the role of a receiving party 900. A system controller 80 interfaces with these roles.

In a typical delivery and pickup scenario, a vendor is the leaseholder 70, the customer 72 is an end-user, and a third-party delivery/pickup agent 74 is a transporter of the goods. The most important of the roles, in a sense, is that of the leaseholder. The leaseholder 70 is the party who leases a unit in the locker module. In the preferred embodiment, either the vendor or the delivery/pickup agent can play the role of the leaseholder 70, though typically, the vendor will be the leaseholder 70. In this case, the leaseholder 70 who is the vendor, has leased a locker unit from the system controller 80 hence the leaseholder has a direct relationship with the system controller 80. The leaseholder 70 also has a direct relationship with the customer 72 as it has sold goods to him. The leaseholder 70 further has a direct relationship with the delivery agent 74 as the vendor has hired the delivery/pickup agent 74 to make the delivery of the purchased good to the leased locker unit or collect a returns from the leased locker unit. Therefore, in a typical delivery scenario, the leaseholder 70 and the delivery agent 74 is the delivery party while the customer 72 is the receiving party.

A variation of a typical delivery scenario would involve an individual (delivery party) who wishes to make a delivery to the end user (receiving party). Referring to FIG. 4, the delivery party is the leaseholder 70 as well as the delivery agent 74 (the transporter of the goods), and the receiving party 72 is the end user. In the preferred embodiment, the delivery party individual plays the role of the leaseholder 70 as well as delivery agent 74. The delivery party has leased a locker unit from the system controller 80 hence it has a direct relationship with the system controller 80. The leaseholder 70 also has a direct relationship with the receiving party (the end user 72) as it wishes to deliver something to him. The leaseholder 70 further has a direct relationship with the delivery agent 74 as he is also playing the role of a delivery agent 74, making the delivery of the good to the leased locker unit.

The role of the system controller 80 always remains the same—as the facilitator of the transactions. Some of the system controller's main duties are shown in FIG. 4. Among others, the system controller 80 facilitates the registration all of the parties onto its system. It facilitates the leasing of the locker unit to the leaseholder. It also receives the delivery and pick-up manifests, resolves any exceptions, manages preferences, and monitors the status of the lease and the locker module. It also manages the automated notification sending of messages to the necessary parties.

Figure 5A:
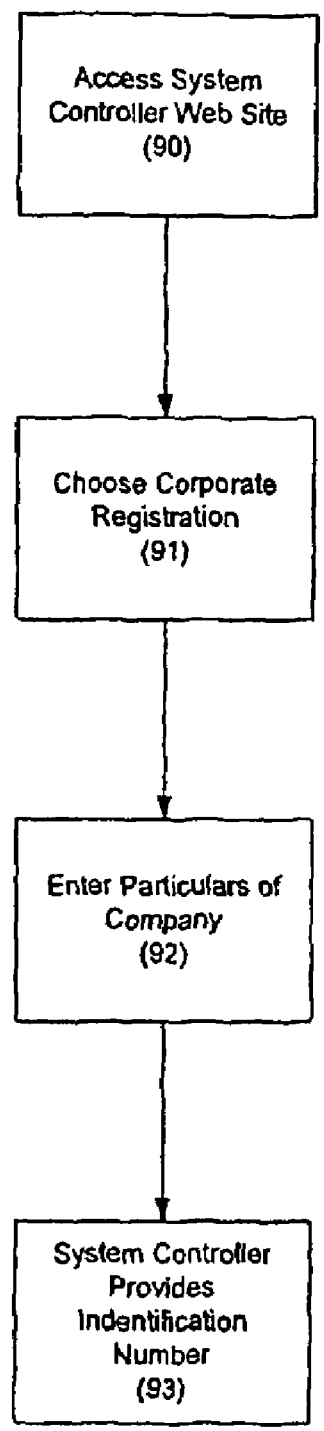
FIG. 5A and FIG. 5B are simplified flow diagrams illustrating the steps for registering a corporate user and delivery persons of the locker system of FIG. 1.

In the preferred embodiment, the vendors, the delivery and pickup agents should be registered with the system controller. The purpose of the registration is to uniquely identify a party. In the preferred embodiment, the registration process is conducted via a web site through the Internet, though clearly, other modes of communication are clearly possible. Referring now to FIG. 5A, the registration process begins in step 90 at which a corporate user, i.e., a vendor or delivery/pickup agent, accesses the system controller's web site. In step 91, the corporate user then chooses the corporate registration option. In step 92, the corporate user provides the corporate particulars, which may include a corporation's name, address, contact person, phone number etc. The particulars also include a login name of identifier (login ID) and a password or identification. Once the requested information is entered and submitted, the system controller provides the corporate user an identification number identifying the corporation in step 93. The corporate user is now registered. The corporate user's registration process may be used either by the vendor or the delivery/pickup agent.

Figure 5B:
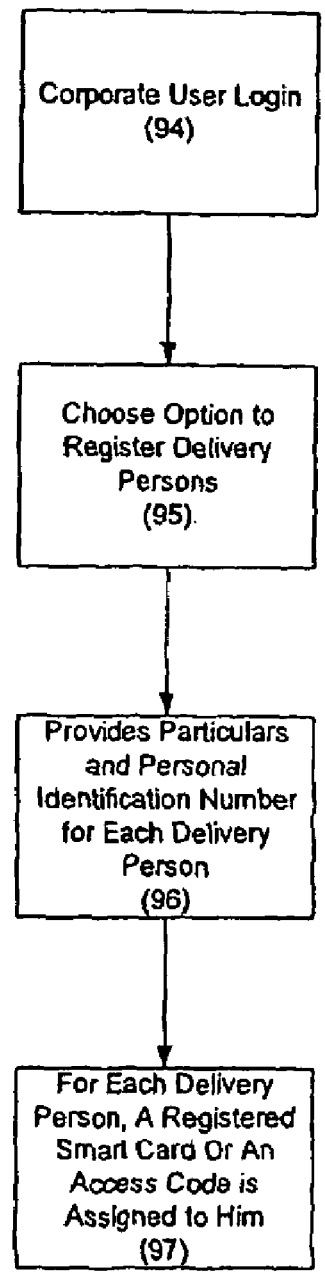

Although after executing the steps in FIG. 5A the corporate user is registered, the corporate user may still need to register its delivery or pickup persons. This is particularly true if the corporate user is a delivery/pickup agent such as global courier company where delivering goods is its main function. However, even if the corporate user is a vendor such as a multi-national computer manufacturer where its main function is not necessarily delivery, it may still wish to register its delivery persons if the corporation offers a delivery service. FIG. 5B illustrates the steps for registering the delivery persons.

Referring to FIG. 5B, in step 94, the registered corporate user logins at the system controller's web site using its login name and password. If the proper login name and password are entered, the user is given access to various options. In step 95, the corporate user chooses the option to register its delivery or pickup persons. In step 96, the corporate user provides the particulars of each of the delivery or pickup persons in the fields provided. The particulars may include name, address, etc. The particulars should also include a login ID and pin number or identification code. In step 97, each delivery person may be assigned a registered smart card to be used in conjunction with the pin number to access the locker modules. Access codes could be used in place of the smart card.

A subscription process may optionally be employed after the registration. The subscription process is basically a scheme by which the corporate users choose a particular region of coverage. If the subscription process is used, the corporate users may only lease the locker modules, which are located within the subscribed region. A subscription model may be used based on the extent of the region of coverage of the locker modules to be used.

While pre-registration of the customer may be desirable, it is not required. In order for the customer to receive their deliveries at the locker module, they would have to provide at least a notification identifier to the vendor or delivery agent making the delivery.

The notification identifier is associated with a customer and is something personal to the customer. It provides information on how the notification message of a delivery to be picked up can be sent to him. Any form of notification identifiers is possible as long as that form provides a unique identification of the customer, sufficient information to contact the customer and sufficient security for the notification identifier to be considered personal to the customer. Some examples of notification identifiers are a mobile or pager number, email address, or instant messaging number.

In the preferred embodiment, the notification identifier is a mobile phone number. When this is provided and a delivery has been made to the customer, a SMS notification message will be sent to the mobile phone. There are many advantages to using a notification identifier. Notification identifiers are often something personal and are used frequently such as, for example, a mobile phone number or an email address. Hence, the customer is less likely to forget notification identifiers. Another advantage of this is that the customer is able to always provide his latest contact information for the delivery to be done as he provides his identification identifier only when he wants a delivery to be made to the locker module. Therefore, there is no need for registration and management of an account.

In the preferred embodiment, the notification identifier is used in conjunction with an identification code that is provided in the notification message, for the customer to gain access to the locker unit to collect his good. This is more advantageous than using an IC Card and pin to access the locker unit as these cards can be lost or spoilt. Also, with the notification message sent using the notification identifier, the customer has no need to memorise his pin number, thus eliminating another problem of having to remember and manage his identification code.

The identification code is a unique one-time code that the customer has to present to the locker module in order to collect his delivery. This identification code is generated by the system controller and is limited for each transaction only and cannot be used again for another transaction.

The preferred embodiment shall now be described in light of the various scenarios that can happen during a delivery or pickup.

There are several scenarios where a delivery can be made with the present system. In some of the scenarios, the vendor, and delivery agent are registered with the system controller where they provide their particulars and register a smart card and a pin number. Alternatively, the system controller could issue a company access code and pin number to the registered vendor and delivery agent. For the delivery agent, it registers itself as a company as well as the individual persons who will be making the delivery. The purpose of registering with the system controller is to provide the system with credentialing and identification details of the one making the delivery. As for the customer, he can choose to be registered with the system controller. However it is not necessary. Instead, he has to provide his notification identifier to the vendor or delivery agent before delivery can be done. This notification identifier is associated with the customer and also provides information on how the notification message can be sent to him. For example, the notification identifier can be his mobile or pager number, email address, instant messaging number or the like. If the notification identifier provided is a mobile phone number, an SMS notification message will be sent to the mobile phone. The advantage is that the customer is able to always provide his latest contact information for the delivery to be done.

In the first delivery scenario, a locker module of the present invention is located near the customer's home. A customer makes an order to the vendor and request for the delivery of the order to be made to the locker module, as there will be no one present at home to receive the good. The customer provides his notification identifier and request for payment to be made only at the point of collection of his good. The vendor uses an independent delivery agent, e.g. post office, for the delivery. The vendor and delivery agent are both registered with the system controller. In this case, the delivery party comprises of the vendor and delivery agent, and the receiving party is the customer.

A flow diagram illustrating the general process flow for facilitating such a delivery is shown in FIG. 6A. Here, the vendor makes a reservation or leases a locker unit and informs the delivery agent of the reservation. During leasing of the locker unit, the vendor provides the required details of the customer and the delivery agent so that the respective parties can access a leased locker unit. The vendor then notifies the registered delivery agent to deliver the good to the leased locker unit of the specified locker module. The delivery agent then sends a registered delivery person to the site of the locker module. The registered delivery person uses a registered smart card with pin to access the leased locker unit to drop off the goods into the locker unit. Alternatively, the delivery person can also access the leased locker unit by using the company access code and pin number issued. In this case, no smart card is necessary. The system controller notifies the customer that the delivery has been made and that he should pick up the delivered good. Notification is sent using the notification identifier provided by the customer. The customer accesses the leased locker unit by entering at least an identification code provided in the notification message.

FIG. 6A provides only an overview of the delivery transaction. The details of each of the steps in FIG. 6A are described as follows. Referring now to FIG. 6A, in step 100, the parties are first registered where the vendor and delivery agent, provide its particulars and register a smart card and a pin number with the system controller. The delivery agent registers itself as a company as well as the individual persons who will be making the delivery.

In step 102, the registered vendor leases a locker unit of appropriate size from the locker module located near the customer's home or of the customer's choice via the Internet using an their computers as their user input interface. During the leasing process, the vendor provides the required details of the customer, e.g., customer's notification identifier, (in this case the mobile phone or pager number), and the delivery agent so that the respective parties can access the leased locker unit. In step 104, the vendor then notifies the registered delivery agent to deliver the good to the specified locker unit of the specified locker module. In step 106, the delivery agent sends a registered delivery person to the site of the locker module, who then uses a registered smart card to access the specified locker unit to drop off the good into the locker unit. In step 108, the system controller notifies the customer via the notification system, e.g. SMS network that the delivery has been made and that he should pick up the delivered good. In step 110, the customer accesses the locker unit by entering an identification code and notification identifier, e.g. mobile phone number and picks up the delivered good after making the necessary payment at the locker module.

In the second delivery scenario is the same as in the previous scenario except that the no prior reservation or lease is made on the Internet. Instead, the locker unit is reserved or leased only at the point of delivery at the locker module. In this scenario, the vendor does not need to be registered with the system controller and can appoint a delivery agent who is registered to make the delivery. When the vendor informs the delivery agent to make a delivery, the vendor provides the delivery agent the location of the locker module and the customer's notification identifier. A registered delivery person takes the goods to the specified locker module and leases a locker unit at the site. The delivery person provides the notification identifier to the locker module. By sending a notification message, the system controller notifies the customer that the delivery has been made and that he should pick up the delivered good. The customer accesses the locker unit by entering an identification code provided in the notification message. In this case, the delivery party is the delivery agent and the receiving party is the customer.

A variation of this scenario is when the registered delivery person makes a delivery attempt to the home of the customer but there is no one physically present at home to receive the good. However, the delivery person is able to obtain the customers notification identifier, e.g. mobile phone number. He can choose to make a delivery to the locker module directly, thus saving a second trip using the general steps described above.

FIG. 6B provides an overview of a delivery transaction and details of each of the steps in the delivery transaction are provided as follows. Now referring to FIG. 6B, in step 120, the delivery agent registers a smart card and a pin number with the system controller for its delivery persons. In step 122, the vendor informs the delivery agent to make the delivery. Here, if the vendor is aware of the present locker system, the vendor provides the delivery agent the notification identifier, e.g. mobile or pager number of the customer and may even specify the location of the locker module where the delivery needs to be made. In step 124, the delivery agent uses a registered delivery person to make the delivery. The delivery agent is informed by the vendor of the notification identifier of the customer and the location of the locker module. The delivery person goes directly to the locker module location and leases a locker at the site using the user input interface provided at the locker module. The delivery person has to provide at least the notification identifier of the customer.

In step 126, once the delivery is made, the system controller sends a notification message using the identification identifier that was provided by the delivery person. For example, if a mobile phone number was provided, a SMS message will be sent. In step 128, once the customer reads the notification message, the customer picks up the delivered good using an identification code and his notification identifier.

In the third delivery scenario, two parties wish to make a goods transfer. However, they are both not registered with the system controller. Essentially, there is a just a delivery party of the good and a receiving party of the good. No prior reservation or registration is made or is necessary.

The delivery party could be a vendor, a delivery agent or an individual who wish to make a delivery to an individual or a group (receiving party) but who has not made any previous registrations with the system controller. The delivery party could also be an individual who wishes to make a delivery to a receiving party, where the receiving party can be another individual, vendor or delivery agent. The delivery party could also be an individual who wish to make a delivery to another individual (receiving party). An example would be a non-registered laundry deliveryman who tries to deliver some laundry to a customer. However, as there is no one physically present at home to take the delivery. Usually, in such a scenario, the deliveryman has to make a second attempt. However, if he has the customer's notification identifier, e.g. mobile phone number, he can use the locker system to make the delivery.

The non-registered delivery party takes the goods to the specified locker module and leases a locker unit at the site by either making a payment for fixed lease duration or indicating that the receiving party has to pay for the lease. The delivery party provides the notification identifier of the receiving party to the locker module. By sending a notification message, the system controller notifies the receiving party that the delivery has been made and that he should pick up the delivered good. The receiving party accesses the locker unit by entering an identification code provided in the notification message and making payments for the lease if necessary. In this scenario, the delivery party and the receiving party can be the same person, i.e. the delivery customer is using the locker module as a temporary storage facility.

A flow diagram illustrating the general process flow for facilitating a delivery for the scenario described above is shown in FIG. 6C. A locker module of the present invention is located at a convenient location for both parties and both parties agree to the good being delivered there by the delivery party and later to be picked up by the receiving party.

FIG. 6C provides only an overview of a delivery transaction. The details of each of the steps of the delivery transaction are described as follows. Now referring to FIG. 6C, in step 130, the delivery party needs to make a delivery to a receiving party. No prior registration is required for both the delivery and receiving parties. The receiving party must provide the delivery party his notification identifier, e.g. mobile or pager number and specify the location of the locker module where the delivery needs to be made. In step 132, the delivery party goes directly to the locker module location and leases a locker unit at that location and makes the delivery.

In step 134, once the delivery is made, the system controller sends a notification message using the identification identifier that was provided by the delivery party. For example, if a mobile number was provided, a SMS message will be sent. In step 136, once the receiving party reads the notification message, the receiving party picks up the delivered good using an identification code and his notification identifier at the locker module.

Typically this scenario could also apply in a case where a customer wants to make a return of a good to a vendor who is not registered with the system. Instead of having to undergo all the steps of registration, the non-registered vendor can just provide the customer his notification identifier, e.g. mobile phone number. The customer can then make the drop off at the chosen locker unit and the system controller will inform the non-registered vendor via his notification identifier of when and where he can do his pickup. In this case, the vendor is the receiving party and the customer making the return is the delivery party. In another variation to this, a customer may want to use the locker unit as a temporary storage facility. The customer now plays the role of both the delivery and receiving party. In all cases, payment can be collected at the locker module either during delivery or during collection, depending on how a payment scheme is implemented.

There is an added security over other systems in that the identification code that is required to access the locker unit after the delivery is made is only made available to the receiving party through the notification identifier of the receiving party. The delivery party does not know the identification code and has no access to it. Therefore, he cannot access the locker unit after the drop off has been made.

In the fourth delivery scenario, it is a typical delivery scenario where a customer makes an order to the vendor and request for the delivery of the order to be made to the home. There is a locker module of the present invention located near the customer's home. However, the customer has not requested for the good to be delivered to the locker module, and neither has he provided any notification identifier to the delivery person making the delivery. The assumption for this scenario is that the delivery agent and associated delivery persons are registered.

When the delivery person makes a delivery attempt, there is no one physically present at the customers home to receive the good. In this case, if the delivery person is able to obtain the customers notification identifier, e.g. mobile phone number, he can make a delivery to the locker module directly, thus eliminating the need for another delivery attempt.

However, if no notification details of the customer are available, the delivery person drops of a delivery advice informing the customer of his delivery attempt and informing him that the good can be collected from the locker module. At the locker module, the delivery person leases a locker unit of an appropriate size from the locker module by providing a unique delivery identifier (e.g. delivery order number, or registered article number) of the good to be delivered and some customer address details. The delivery advice that is dropped off provides details of how the customer can collect his delivery from the locker module. Essentially, the customer is required to contact the system controller and provide his notification identifier and delivery identifier using an automated notification system (e.g. Interactive Voice Response System or a web based enquiry system). The system controller will send the notification message to the customer using the notification identifier provided. By sending a notification message, the system controller notifies the customer that the delivery has been made and that he should pick up the delivered good. The customer then accesses the locker unit by entering an identification code or pin number provided in the notification message. In this case, the delivery party is the delivery person and the receiving party is the customer.

FIG. 6D is a flow diagram illustrating the general process flow for facilitating a delivery to the customer even when no notification identifier of the customer is available. Here, when the delivery person is unable to make a successful home delivery, he drops off a delivery advice card at the customer's home and makes a lease of a locker unit at the locker module to deliver a good. The customer then follows instructions indicated in the delivery advice to make a collection of the good from the locker unit.

FIG. 6D provides only an overview of a delivery transaction. The details of each of the steps of the delivery transaction are described below. Referring now to FIG. 6D, in step 150, the delivery agent and its associated delivery persons are registered with the system controller. In step 152, the delivery person attempts to make a delivery of a good to the customer's home. However, the delivery cannot be completed, as there is no one present to receive the good. Also, he has no contact details of the customer and is thus unable to obtain a notification identifier of the customer. Instead of having to make a second delivery attempt, the delivery person drops off a delivery advice card informing the customer of his delivery attempt and that the customer can pick up the good from the locker module. In this scenario, the delivery person, in step 154, goes to the locker module and leases a locker unit of appropriate size to store the good. In leasing the locker unit, the delivery person provides particulars that include a good identification number (e.g. delivery order number or registered article number) and customer address details.

The customer is instructed by the delivery advice to contact the system controller to obtain details of his collection. In this scenario, the customer calls an Interactive Voice Response System or logs on to a website managed by the system controller and provides his notification identifier and delivery identifier. This is done in step 156. The system controller in step 158 sends a notification message to the customer via the notification identifier. In the preferred embodiment, the customer's mobile phone or pager is used e.g. Short Message Service (SMS) message that the delivery has been made and that he should pick up the delivered good. In step 160, the customer accesses the locker unit by entering an identification code and notification identifier, e.g. mobile phone number and picks up the delivered good after making payment at the locker module, if necessary. After collecting his good and closing the door, the system controller is notified and the transaction is completed.

In the preferred embodiment of this invention, the method of facilitating a delivery and collection of goods where the method involves a customer, a vendor, and a delivery agent, the delivery agent having a plurality of delivery persons, the vendor having to deliver a good to the customer using the delivery agent comprises the steps of providing a locker module having a plurality of locker units; providing a registration platform for registering the vendor, delivery agent, and at (east one delivery person; allowing a vendor or delivery agent lease a locker unit by providing a set of particulars to the system controller, the particulars including at least a notification identifier of the customer and credentialing information of the delivery person; or allowing a registered delivery person to lease a locker unit by having the delivery person provide a set of particulars to the locker module, the particulars including at least a notification identifier of the customer; providing the registered delivery person access to a locker unit when the particulars are provided to the locker module such that the good may be placed inside the locker unit; sending a notification message using the notification identifier provided or entered, the notification message providing at least a notification to pick up the good, a location of the locker module, and a unique identification code; and allowing the customer access to the locker unit containing the good when the unique identification code is provided to the locker module. Clearly, the delivery party comprises of the vendor, delivery agent and its associated delivery person, while the receiving party is the customer.

Further to this, the method of facilitating a delivery of goods where the method involves a delivery party to deliver goods to a receiving party comprises the steps of providing a locker module having a plurality of locker units; allowing the delivery party to lease a locker unit by having the delivery party provide a set of particulars to the locker module, the particulars including at least a notification identifier of the receiving party; providing the delivery party access to a locker unit when the particulars are provided to the locker module such that the good may be placed inside the locker unit; sending a notification message using the notification identifier entered, the notification message providing at least a notification to pick up the good, a location of the locker module, and a unique identification code; and allowing the receiving party access to the locker unit containing the good when the unique identification code is provided to the locker module. In this case, no registration of both parties is necessary.

The preferred embodiment is extended to include the method of facilitating a delivery and collection of goods where the method involves a customer, and a delivery agent, the delivery agent having a plurality of delivery persons, the delivery agent having to deliver a good to the customer's home using the delivery agent but failing as the customer is not at home comprises the steps of providing a locker module having a plurality of locker units; providing a registration platform for registering the delivery agent, and at least one delivery person; allowing a delivery person to drop of a delivery advice at the customer's home and lease a locker unit by providing a set of particulars to the system controller, the particulars including at least a delivery identifier and address particulars of the customer; providing the registered delivery person access to a locker unit when the particulars are provided to the locker module such that the good may be placed inside the locker unit; providing an automated notification system for customers to provide their notification identifier; sending a notification message using the notification identifier provided, the notification message providing at least a notification to pick up the good, a location of the locker module, and a unique identification code; and allowing the customer access to the locker unit containing the good when the unique identification code is provided to the locker module.

There are two scenarios where pickup transactions can be made with the present system.

In this first pickup scenario, the parties may first be registered where each of the parties, the pickup agent and vendor provides his particulars and registers with a smart card and a pin number with the system controller. Alternatively, the system controller could issue a company access code and pin number to the registered vendor and pickup agent. The vendor and the pickup agent could both be registered as a company as well as the pickup persons who will be making the pickup. The customer need not be registered even when he wants to use the service as long as he is able to provide a notification identifier. When the customer wants to make a good return to a registered vendor, he will notify the vendor with his particulars (including notification identifier) and the locker module where he wishes to perform the returns. The registered vendor leases a looker unit of appropriate size from the locker module of the customer's choice via the system controller's web site. During the leasing process, the vendor provides the required details of itself and the customer so that the respective parties are able to access the leased locker unit. The system controller then notifies the customer through a notification message that a locker unit has been reserved for him. The customer drops off the good in the locker unit per the system controller's message, using the identification code provided in the notification message. The system controller then notifies the vendor that the good has been dropped off. The vendor picks up the good using a registered pickup person. The vendor could also appoint a registered pickup agent and his pickup person to pick up the good.

A typical pickup scenario such as where a customer wants a Laundromat to pickup his laundry to be cleaned can be illustrated by the different roles that are required in such a situation. In this scenario, the vendor is also the pickup agent, and takes on the role as a leaseholder. The customer is again the end user. The vendor has a direct relationship with the system controller as the vendor leases a locker from the system controller. The vendor also has a direct relationship with the customer as the vendor performs a service on the good to be picked up. In this case, the delivery party is the customer while the receiving party is the vendor (who plays the role of both the leaseholder and pickup agent).

A flow diagram illustrating the general process flow for facilitating a pickup for the scenario shown is shown in FIG. 7A. This is a scenario where a customer wants a vendor to pickup a good such as a laundry or a broken item to be cleaned or repaired. But the vendor operates during hours when the customer will not be present at home to hand over the good. A locker module of the present invention is located either near the customer's home or at a convenient location. The vendor will be sending someone from his company to pickup the good. FIG. 7A provides only an overview of the pickup transaction; the details of each of the steps in FIG. 7A shall be provided further below.

Now referring to FIG. 7A, in step 250, the vendor is first registered as a company as well as the individual persons who will be making the pickup with the system controller by providing particulars of the company and the pickup persons. The vendor also registers smart cards and pin numbers for each pickup agent. If pickup agents are used, they are to be registered with the pickup persons as well. Instead of using smart cards, an access code could be issued.

In step 255, the customer requests for a pickup service from the registered vendor and he leases a locker unit of appropriate size from the selected locker module via the Internet. During the leasing process, the vendor provides the required details of itself and the customer so that the respective parties are able to access the leased locker unit. In the preferred embodiment of the system, the customer's notification identifier is required and this could be his mobile phone number. In step 260, the system controller notifies the customer that a locker unit has been reserved for him. The notification message will include details of locker location, locker unit number and an identification code or pin number to access the locker unit. Alternatively, or in conjunction, the vendor notifies the customer of the same. In step 265, the customer drops off the good in the locker unit per the system controller's message. In step 270, the system controller notifies the vendor that the good has been dropped off. This could be in the form of reports or automated phone calls. Alternatively, or in conjunction, the customer notifies the vendor of the same. In step 275, the vendor picks up the good using a registered pickup person.

In the second pickup scenario, an enhanced pickup or returns service could also be provided for registered vendors. An interface could be created allowing the customer to directly make the good returns using the user input interface at the locker module without the need of contacting the registered vendor. This is especially useful for vendors expecting large volumes of returns and would like to offer extended convenience and operating hours to their customer. Such vendors could be Laundromats, Video Rental Stores, Book Rental Stores or Equipment Rental Stores. A locker module of the present invention is located either near the customer's home or at a convenient location. This could be at high traffic areas such as train stations. The locker modules could even be located outside the vendor's premise, thus offering round the clock return facilities. When the returns are done, the vendor will be sending someone from his company to pickup the good. The customer selects the vendor that he wishes to make a good return to at the locker module by selecting the appropriate vendor code, leases a locker unit of appropriate size from the locker module and drops off the good. When this is done, the system controller will notify the registered vendor of the need to collect the returns. The vendor picks up the good using a registered pickup person or appoints a registered pickup agent to do perform the pickup using the identification code provided in the notification message. Customers may be required to pay for the service depending on the arrangement with the vendors.

A flow diagram illustrating a customized process flow for facilitating a pickup is shown in FIG. 7B. FIG. 7B provides only an overview of the pickup transaction; the details of each of the steps in FIG. 7B shall be provided further below.

Now referring to FIG. 7B, in step 250, the vendor must first be registered as a company as well as the individual persons who will be making the pickup with the system controller by providing particulars of it and the pickup persons. It also registers smart cards and pin numbers for each pickup agent. Instead of using smart cards, an access code could be issued.

In step 300, the registered vendor subscribes for a customized system at the locker module where the customer can select to directly make a good return to the vendor. Different vendor returns selections are made available at the locker modules. The customer, in step 310, will select the appropriate vendor at the locker module and enters his particulars and select appropriate locker unit size. In the preferred embodiment, the customer should also enter his notification information as well as make a payment (optional—depending on vendor scheme) before he can access the locker unit. Once the locker unit door has been closed, the system controller is informed of the status of the transaction and notifies the vendor of the need to perform a pickup in step 320. The notification message will provide an identification code that will be used by the pickup persons to unlock the locker unit to pickup goods. The notification message could be in the form or emails, reports, automated phone calls or on the system controller website. The vendor then arranges for the pickup to be done using his registered pickup persons in step 330.

Further customization could be done for the vendors by automatically notifying their preferred pickup agent to perform the pickups rather than picking it up themselves. In this case, the registered pickup agents could even offer a one stop returns service for a number of vendors, who need not be registered with the system.

In both pickup scenarios, the vendor could also arrange for a registered pickup agent and their pickup persons to perform the pickup, instead of doing it themselves. In all cases, the identification code provided for in the notification message is used to access the locker units to pick up the goods.

In the preferred embodiment of this invention, the method of facilitating a pickup of goods where the method involves a customer, a vendor, and a pickup agent, the pickup agent having a plurality of pickup persons, the vendor having to pickup a good from the customer using the pickup agent comprises the steps of providing a locker module having a plurality of locker units; providing a registration platform for registering the vendor, pickup agent, and at least one pickup person; allowing a vendor or pickup agent lease a locker unit by providing a set of particulars to the system controller, the particulars including at least a notification identifier of the customer and credentialing information of the pickup person; sending a notification message using the notification identifier provided, the notification message providing at least a notification to drop off good for returns, a location of the locker module, and a unique identification code; and allowing the customer access to the locker unit to drop off the good when the unique identification code is provided to the locker module; providing the registered delivery person access to a locker unit when his credentialing particulars are provided to the locker module such that the good may be picked up from the locker module.

The preferred embodiment of this invention further includes, the method of facilitating a pickup of goods where the method involves a customer, a vendor, and a pickup agent, the pickup agent having a plurality of pickup persons, the vendor having to pickup a good from the customer using the pickup agent comprises the steps of providing a locker module having a plurality of locker units; providing a registration platform for registering the vendor, pickup agent, and at least one pickup person; providing a special interface at the locker module for customer to access to the locker unit to drop off returns; sending a notification message to the vendor/pickup agent, the notification message providing at least a notification to pickup good for returns and location of the locker module; providing the registered pickup person access to a locker unit when his credentialing particulars are provided to the locker module such that the good may be picked up from the locker module. In the preferred embodiment, the credentialing particulars would include a access code and unique identification code that will be given to each vendor/pickup agent for each locker module as this allows the vendor/pickup agent more flexibility of assigning a pickup person to pickup the returns without having to register the pickup person. This is given in a form of notification message, which could be in the form of a report.

In both pickup scenarios, the customer is the delivery party while the vendor and/or pickup agent is the receiving party. In the second scenario, the vendor code is also known as the receiving party code.

The leasing process will now be elaborated to explain the preferred embodiment of the invention. Leasing of a locker unit for delivery can be done from the Internet or at the locker module. The user input interface from the Internet could be a computer device connected to the Internet, while the user input interface at the locker could be the computer monitor and keypad.

Figure 8:
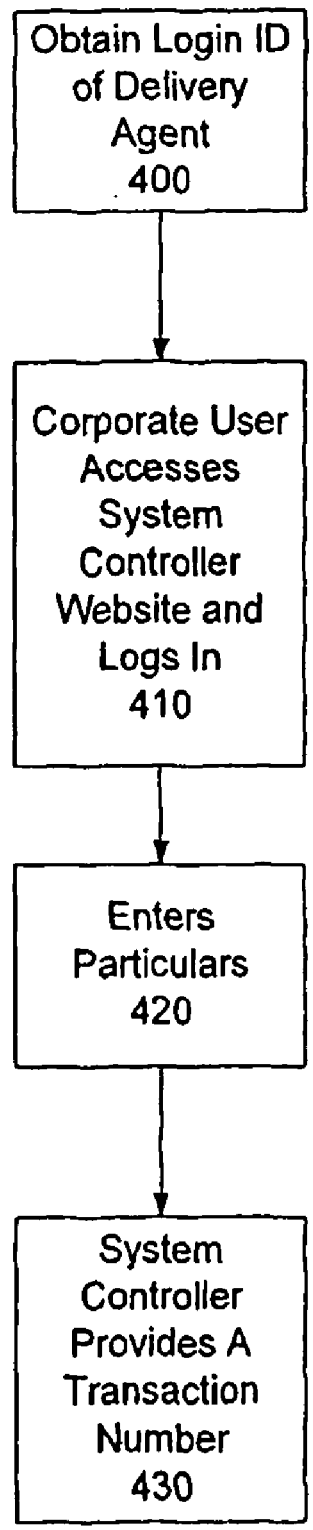
FIG. 8 is a flow diagram illustrating the steps for reserving via the Internet a locker unit of the locker system of FIG. 1.

Referring to step 102 in FIG. 6A and step 120 in FIG. 6B, once the parties are registered per the steps shown above, a locker unit may be leased by a corporate user (who could be a vendor or a delivery agent). FIG. 8 illustrates the preferred process for a corporate user to lease a locker unit from the Internet. In step 400, the corporate user obtains the login identification number (or "login ID") of the delivery agent. The delivery person's login identification number need not be known at this point, but may be entered if it is available. In step 410, the corporate user accesses the system controller's web site, enters the proper login ID and password, and chooses the option to reserve a locker unit. In step 420, the corporate user provides the particulars requested by the system controller. In the preferred embodiment, the particulars are the delivery agent's login ID, the location of the locker module, size of the locker unit needed, the date of the lease, duration of the lease, and the customer's notification identifier, e.g. mobile or pager number.

Once all of the information is provided, the system controller provides the corporate user with a unique transaction number in step 430 and reserves the designated locker unit and the designated locker module at the designated date. The lease is good for a specified duration.

Now referring to step 104 of FIG. 6A and step 122 of FIG. 6B, the vendor notifies the delivery agent of the delivery. Besides the usual information provided to a delivery agent, e.g., company particulars, the vendor provides the unique transaction number obtained in step 430 to the delivering agent. The vendor may communicate this information in any way that is convenient to the parties.

Now referring to step 106 of FIG. 6A, using the transaction number, the delivery agent accesses the vendor's locker reservation request site on the system controller's web site. From the site, the delivery agent is able to ascertain the both the location and the time of delivery as the transaction number will allow it to access the lease information. Once there, the delivery agent enters the login ID of the delivery person who will be making the delivery to complete the lease transaction. The system controller sends all necessary lease information to the locker module carrying the leased locker unit. The locker module controller then uses the information to provide selective access to the leased locker unit.

To make the delivery, the designated delivery person takes his designated smart card to the designated locker module site on the designated date. Once there, he inserts the card into the slot provided. The locker controller reads the unique serial number of the card and after conducting a series of checks asks for the delivery person's pin number on the monitor. In place of the designated smart card, an access code could be used as well. The locker controller opens the leased locker unit only if the proper pin number or identification code is entered via the provided keypad.

The preferred embodiment also allows for a lease to be made at the locker module itself. In this case, only the delivery agent and its associated delivery persons need be registered with the system controller. Instead of leasing on the Internet, the delivery agent chooses to only lease the locker at the point of delivery at the locker module.

The locker leasing process for the step shown in step 124 of FIG. 6B is somewhat different than that shown in step 102 for FIG. 6A. In step 124, when the delivery person inserts his smart card into the locker module, by reading the serial number of the smart card and matching it against the database, the locker controller is aware that no prior locker reservation has been, and that the delivery agent will be leasing a locker unit. Assuming that the delivery person's smart card has been properly registered, the locker module prompts the person to enter his pin number. Only if a proper pin number is entered will the delivery person be allowed to make a lease at the locker module. The locker module will prompt the delivery person to enter the notification identifier, e.g. mobile phone or pager number, of the customer. Once the number is entered, the person is prompted to enter the particulars of the lease and the delivery, which can include, among others, the size of the locker needed, duration of the lease, and the delivery order number (for delivery agent's own records). When all the information is entered and confirmed, the appropriate locker unit opens. After the delivery person places the goods inside the locker unit and properly closes the door, the module asks if any additional transactions are needed. Once confirmed "no", the lease transaction ends, and the smart card is returned back to the delivery person. A pre-made set of selections may be provided for the location of the locker module and the size of the locker unit.

The preferred embodiment of the present invention further extends the ability to make a lease for delivery of a good to the locker module to a user who is not a corporate user (i.e. non registered vendor or delivery agent and its delivery persons). Referring to FIG. 6C step 132, the delivery customer obtains the receiving customer's notification identifier and leases a suitable locker unit at the point of delivery at the locker module. The delivery customer selects the appropriate transaction at the locker module and is prompted to enter particulars of the lease, including the receiving customer's notification identifier, appropriate locker unit size and lease duration. In the preferred embodiment, payment for the lease is to be done by the delivery customer first before he is allowed access to the locker unit. However, there is also a possibility of having the receiving customer pay for the lease at the point of collecting the delivery.

In the leasing process for the delivery of a good to a customer when no customer notification identifier details are available, the registered delivery person in FIG. 6D step 154 leases a locker unit at the locker module by selecting a lease function that will require the delivery person to enter particulars of the transaction; including at least the good identifier, which could be the delivery order number or registered article number, and address details of the customer. To access this function, the delivery person will have to insert his smart card into the locker module and enter his pin. Only after verification of his details, by reading the serial number of the smart card and matching it against the database, will he be allowed to proceed with the transaction. Once the required details are entered, the delivery person will be given access to the locker unit to make his delivery. Details of this transaction are sent to the system controller.

Now referring to step 108 of FIG. 6A, step 126 of FIG. 6B and step 134 of FIG. 6C, once the delivery is made and the leased locker unit's door is properly closed, the status of the transaction is remotely sent by the locker controller to the system controller. The system controller is now aware that the delivery has been made. The system controller then notifies the customer that the delivery has been made and that the good is ready to be picked up. The notification message is sent, depending on the type of notification device the customer has, it could be via an SMS message to the mobile phone or pager number provided by the customer and which was entered by the vendor during the locker reservation.

Referring to FIG. 6D step 156, the customer has to contact the system controller and provide his notification identifier in order to receive the notification message. This is for the event that the delivery person has made a delivery to the locker module without having any notification details of the customer. Upon contacting the system controller, the customer is required to provide details of his delivery identifier and notification identifier. The system controller will check if such a delivery identifier exists in the system. Only if it exists will the notification message be sent to the customer using the notification identifier provided.

The notification message can include, among others, a note that a delivery has been made, the location of the locker module, locker unit number, when the lease will expire, an identification code, and a telephone number to call for help (if help is needed).

Now referring to step 110 of FIG. 6A, step 128 of FIG. 6B, step 136 of FIG. 6C and step 160 of FIG. 6D, when the customer receives the message that the delivery has been ready, the customer goes to the locker module site. Once at the locker module, the customer enters the identification code provided in the notification message. The locker module may optionally ask for the customer notification identifier, e.g. mobile phone number, or delivery identifier, e.g. delivery order number for additional security. When the proper identification code is entered, the leased locker unit opens for the customer to pick up the good. After the customer picks up the good and the locker door is properly closed, the status is transmitted by the locker controller back to the system controller. The delivery transaction is now completed.

For the delivery transactions to be executed smoothly and safely, the system controller in conjunction with the locker module controller performs a number of administrative tasks both during and apart from the transactions, which shall now be described.

The system controller maintains a large database of the registered users. The database is well catalogued so that the particulars of the users can be readily accessed. During the registration process, the system controller ensures that no identical login names exist. Also, during the smart card registration process, the system controller ensures that a smart card having a serial number, which already exists in the database, cannot be registered.

When a locker reservation is requested, the system controller checks the integrity of all of the necessary entered particulars. First, it ensures that the corporate user making the reservation is properly registered by matching the login name and the password with that in the system controller's database. The same is done for the entered delivery agent's ID, and the delivery person's ID. When the locker module and the locker unit size are specified, the system controller checks against other reservations to make certain of its availability. If the locker unit is not available, the corporate user is so notified.

When the corporate user makes a selection, the system controller defines a set of expected actions from the expected parties. So for instance, when a delivery reservation is made (and assuming that the delivery person's ID has been properly entered), the first expected action would be defined as the delivery person making the delivery at the designated locker module during a period assigned for the lease. Therefore, when the correct delivery person slots in his designated smart card at the designated locker module, or he keys in his assigned access code, access will be given to the reserved locker unit. After the delivery, the next expected action is for the designated customer to pick up the good from the locker unit. Hence, when the proper identification code is entered at the designated locker module, access will be given to the reserved locker unit. If, however, the customer were to attempt to access the locker unit before the delivery is made, the event would not correspond to the expected action, and therefore, access to the locker unit would not be provided even though the customer entered the correct identification code.

The system controller keeps track of all transactions and stores the transaction details in its databases. Some are stored in the database of the system controller while some data is stored in the embedded database of the locker module controller PC depending on its use. The data stored in the embedded database is periodically backed up to the system controller's database. If at any time, a user wishes to obtain the status of a transaction, he may do so by accessing the system controller's web site and choosing the status option. In addition, the system controller stores the past transactions for a limited period. Hence, if a delivery agent, for instance, wishes to obtain a delivery record of a particular delivery person, it may do so. The corporate user can also update any delivery person details at the web site.

The system controller also keeps track of the payments on a lease-by-lease basis. A number of payment schemes are possible using the present system including deducting payment from the smart card at the locker module site. In the locker system for leaseholders who are registered vendors or delivery agents, the system charges a payment only to the leaseholder by keeping track of the number of locker reservations made and billing the leaseholder on a billing cycle. As for non-registered vendors, delivery agents or customers who leases the locker unit at the locker modules, payment is required to be made at the locker module using a smart card or any other payment devices.

The system controller has a procedure for a number of events, which are deviant from the norm. For instance, if a delivery person makes a wrong delivery and needs to access the locker unit again, a recovery procedure is followed where the delivery person or the delivery agent must call a person at the system controller site to allow the delivery person special access to the locker unit. Similar procedure is followed if a delivery person were to place the wrong items in the locker unit during a delivery transaction. If the expected delivery or pick-up is not made within the expected time frame, the leaseholder is contacted to renew the lease.

It at any point the system controller loses communication with a locker module, it determines the source of the problem by checking the communication status of the other locker modules. If it is deemed that the source of the problem is at a particular locker module, a serviceman is sent to rectify the problem.

The system controller also consists of an Automated Notification Message Sending System (ANMSS) 14 as shown in FIG. 1. The ANMSS serves to automate the sending of notification message to the relevant parties, informing them of the need to collect a delivery or make a pickup of good returns. The key to the ANMMS is the use of a notification identifier. The notification identifier provides the ANMMS with sufficient information to send the notification message.

Figure 9:
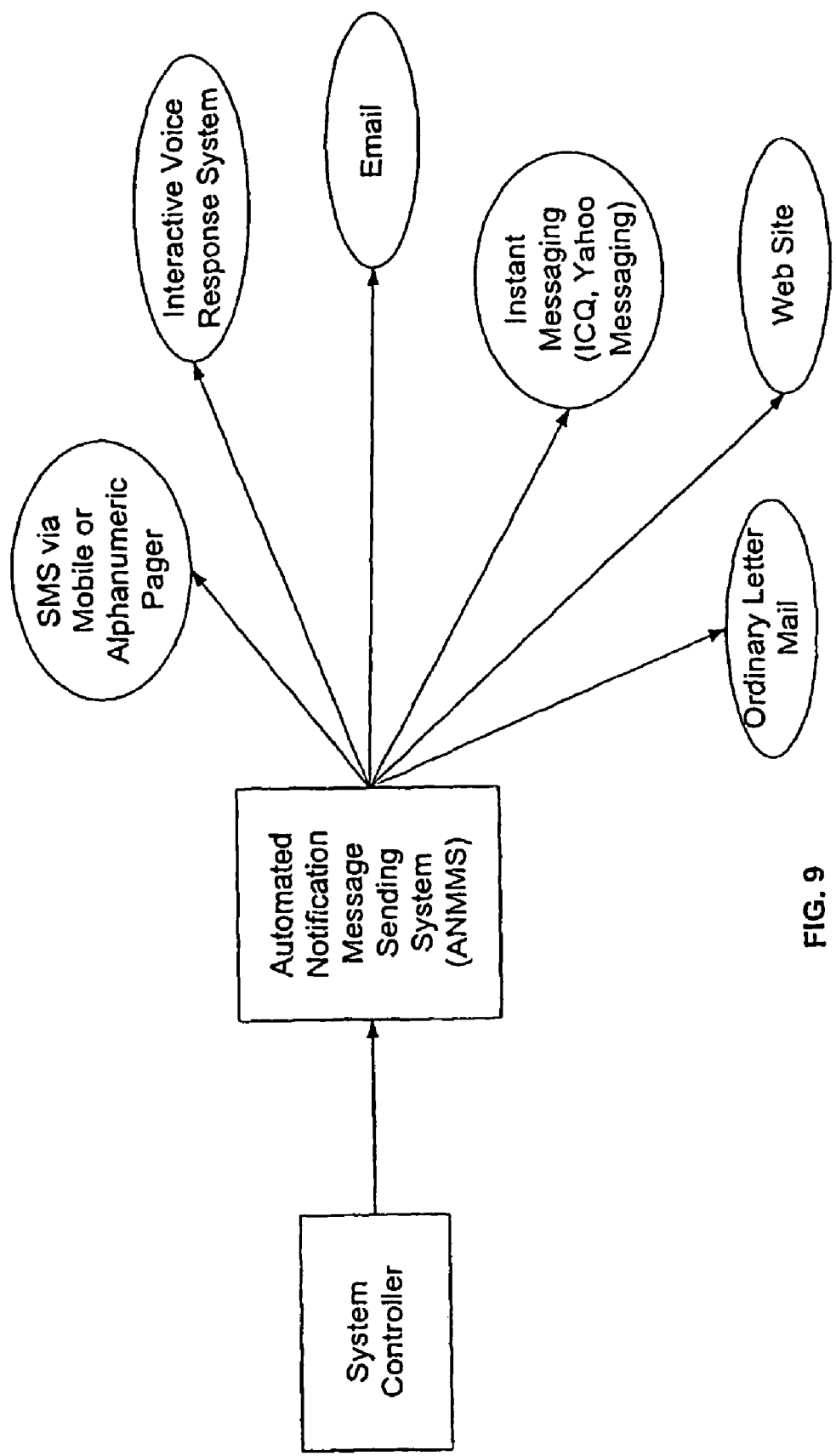
FIG. 9 is a block diagram showing an Automated Notification Message Sending System of the locker system of FIG. 1.

FIG. 9 illustrates how the ANMMS is used to send notification messages. When the vendor, delivery agent or customer registers with the system controller, they will have to provide one or more notification identifiers. However, they will have a preferred choice as to which notification identifier will be used. As for vendors, delivery agents or customers who do not wish to be registered with the system controller and would still want to make use of the locker modules as a transfer facility, they would have to provide their notification identifiers at the locker module.

The notification identifier could be a mobile, pager or phone number, an email address, instant messaging identifier (e.g. ICQ or Yahoo Messaging Number), a good or article number (e.g. Delivery Advice Number or Parcel Identifier) or even a physical address. The notification identifier can also be the login ID of the registered customer.

In the preferred embodiment, the notification identifier is the mobile or pager number of the end user or receiving customer. Hence when the leaseholder accesses the system controller's web site to lease a locker unit as in FIG. 6A, he must provide the customer's notification identifier, which is the mobile or pager number in this case. If the delivery to be made is as described in FIG. 6B, and FIG. 6C, then the notification identifier, which is the mobile or pager number in this case, must be entered at the locker module. When the delivery is completed, the system controller will send a notification message to the end customer using the mobile or pager number provided.

There are cases where the delivery person is not told of the customer's notification identifier when he attempts to make a delivery to the customer's home. A locker of the present invention is located near the customer's home and the delivery person wishes to make a delivery there instead of attempting a second delivery. This process is described in FIG. 6D.

In the preferred embodiment, the ANMMS automatically process any request for notification to be sent out from the system controller. The ANMMS processes the notification messages and associated notification identifier and sends out the message using the relevant notification means. For example, if the notification identifier provided is a mobile phone number, then the notification message will be sent out via the SMS network. If an email address is provided as a notification identifier, then the notification message is sent via an email. Clearly many variations are possible and those listed are for illustrative purposes only and are not exhaustive.

In the preferred embodiment, the ANMMS also provides the Interactive Voice Response System for the process as described in FIG. 6D, so that customers can interact with it to obtain their notification messages. The ANMMS also provides reminder notification messages for customers to make their collections and is able to also send consolidated reports of deliveries or pickups that needs to be done by the delivery/pickup agents.

The present invention may be embodied in other specific forms without departing from the spirit or essential characteristics thereof. The presently disclosed embodiment is, therefore, to be considered in all respects as illustrative and not restrictive, the scope of the invention being indicated by the appended claims and all changes, which come within the meaning and range of equivalency of the claims, are, therefore, to be embraced therein.

What is claimed is:

1. A method for facilitating transfer of goods between a delivery party and a receiving party in a locker system comprising at least one locker module having at least one locker unit, said method comprising the steps of:
   registering, by said delivery party, to provide information on said delivery party for storing in a database associated with said locker system;
   providing, by said delivery party to said receiving party, at least one delivery identifier associated with a delivery attempt;
   receiving, by at least one controller of said locker system, at least one user input provided by said delivery party and associated with said receiving party, said at least one user input being associated with said goods and said receiving party, and including said at least one delivery identifier;
   processing, by said at least one controller, said at least one user input to allow said delivery party to unlock and to deposit said goods into a locker unit of said at least one locker unit;
   providing, by said receiving party to said at one controller, at least one notification identifier based upon said at least one delivery identifier, and
   generating, by said at least one controller and based upon said at least one user input, at least one notification message to said receiving party, said at least one notification message having an identification code for unlocking said locker unit.

2. The method of claim 1, wherein said method further comprises the step of unlocking, by said at least one controller, said locker unit when said identification code is provided by said receiving party to collect said goods.

3. The method of claim 1, wherein said providing step comprises the step of relaying said at least one user input to said at least one controller, said at least one controller being a locker controller associated with said at least one locker module and having a computer monitor and a keypad.

4. The method of claim 1, wherein said providing step comprises the step of relaying said at least one user input to said at least one controller, said at least one controller being a system controller connected to a network.

5. The method of claim 1, wherein said method further comprises the step of transmitting said at least one notification message to said receiving party using said at least one notification identifier when said goods is deposited into said locker unit by said delivery party.

6. A method for facilitating transfer of goods between a delivery party and a receiving party in a locker system comprising at least one locker module having at least one locker unit, said at least one locker unit being unlockable by said delivery party by providing one of an access code and a payment thereto, said method comprising the steps of:
   providing, by said receiving party to said delivery party, at least one user input having at least one notification identifier associated with the receiving party;
   receiving, by at least one controller of said locker system, said at least one user input from said delivery party;
   processing, by said at least one controller, said at least one user input and an indication from said delivery party to allow said delivery party to unlock a locker unit of said at least one locker unit to deposit goods therein, said indication being associated with said payment for unlocking said locker unit, said indication including one of a first payment mode in which the delivery patty makes the payment, and a second payment mode in which the receiving party makes the payment; and generating, by said at least one controller and based upon said at least one user input, at least one notification message to said receiving party, said at least one notification message having an identification code for unlocking said locker unit;

wherein when said access code is unavailable to said delivery party, said at least one controller allows said delivery party to unlock said locker unit after processing said indication.

7. The method of claim 6, where said receiving step is further adapted to allow payment to deposit said goods by said delivery party in said locker unit.

8. The method of claim 5, wherein said method further comprises the step of processing by said at least one controller to unlock said locker unit when said identification code is provided by said receiving party to collect said goods.

9. The method of claim 8 wherein said method is further adapted to allow payment by said receiving party to collect said goods.

10. The method of claim 6, wherein said receiving step comprises the step of providing said at least one user input via a user input interface.

11. The method of claim 10, wherein said providing step comprises the step of relaying said at least one user input to said at least one controller, said at least one controller being a locker controller associated with said at least one locker module and having a computer monitor and keypad.

12. The method of claim 11, wherein said relaying step comprises the step of relaying said at least one user input having at least one notification identifier associated with said receiving party.

13. The method of claim 11, wherein said method further comprises the step of transmitting said at least notification message to said receiving party using said at least one notification identifier when said goods is deposited into said locker unit by said delivery party.

14. A method for facilitating transfer of goods between a delivery party and a receiving party in a locker system comprising at least one locker module having at least one locker unit, said method comprising the steps of:

registering, by said receiving party, to provide information in database associated with said locker system;

receiving, by at least one controller of said locker system, at least one user input provided by said receiving party, said at least one user input being associated with said delivery party; and generating, by said at least one controller and based upon said at least one user input at least one notification message to said delivery party, said at least one notification message having an identification code for unlocking a locker unit of said at least one locker unit;

wherein said receiving step comprises the step of providing said at least one user input via a user input interface, said at least one user input having at least one notification identifier associated with said delivery party.

15. The method of claim 14, wherein said providing step comprises the step of relaying said at least one user input to said at least one controller, said at least one controller being a system controller connected to a network.

16. The method of claim 14, wherein said method further comprises the step of transmitting said at least one notification message to said delivery party using said at least one notification identifier.

17. The method of claim 14, wherein said method further comprises the step of unlocking, by at least one controller, said locker unit when said identification code is provided by said delivery party to drop off said goods.

18. A method for facilitating transfer of goods between a delivery party and a receiving party in a locker system comprising at least one locker module having at least one locker unit, said method comprising the steps of:

registering, by said receiving party, to provide information on said receiving party for storing in a database associated with said locker system;

receiving, by at least one controller of said locker system, at least one user input provided by said delivery party, said at least one user input having at least one notification identifier associated with said receiving party processing by said at least one controller, said at least one user input to allow said delivery party to unlock and to deposit said goods into a locker unit of said at least one locker unit; and generating, by said at least one controller and based upon said at least one user input, at least one notification message to said receiving party, said at least one notification message having an identification code for unlocking said locker unit to retrieve said goods.

19. The method of claim 18, wherein said processing step is further adapted to allow payment to deposit said goods in said locker unit by said delivery party.

20. The method of claim 18, wherein said processing step comprises the step of relaying said at least one user input to said at least one controller, said at least one controller being a locker controller associated with said at least one locker module and having a computer monitor and a keypad.

21. The method of claim 18, wherein said method further comprises the step of transmitting said at least one notification message to said receiving party when said goods is deposited into said locker unit by said delivery party.

22. The method of claim 18, wherein said method further comprises the step of unlocking said locker unit when said identification code is provided by said receiving party to collect said goods.

* * * * *